United States Patent [19]

Easton

[11] 4,036,128

[45] July 19, 1977

[54] BRANDING IRON WITH QUICKLY CHANGEABLE CHARACTERS

[76] Inventor: Harlan Easton, R.F.D. 3, Blooming Prairie, Minn. 55917

[21] Appl. No.: 664,405

[22] Filed: Mar. 5, 1976

[51] Int. Cl.$^2$ .............................................. A01K 11/00
[52] U.S. Cl. .......................................... 101/9; 101/29; 101/31; 101/93.04; 101/373; 197/1 R; 235/145 R
[58] Field of Search ....................... 101/29, 31, 30, 28, 101/399, 109, 373, 372, 201, 93.04, 18–21, 9; 235/145 R, 146; 346/141, 142, 143, 76 R; 219/227; 197/1 R; 128/316; 126/402–404; 62/293; 119/1

[56] References Cited

U.S. PATENT DOCUMENTS

| 39,296 | 7/1863 | Livermore | 197/1 R |
|---|---|---|---|
| 699,496 | 5/1902 | Dawson | 197/1 R |
| 879,462 | 2/1908 | Green | 101/31 |
| 1,164,742 | 12/1915 | Moore | 101/31 |
| 1,173,640 | 2/1916 | Barrett | 235/146 |
| 1,246,186 | 11/1917 | Thomas | 235/146 |
| 1,423,325 | 7/1922 | Heberling | 101/19 |
| 2,935,577 | 5/1960 | Dumke et al. | 235/145 R UX |
| 3,209,681 | 10/1965 | Sanborn | 101/93.04 |
| 3,242,855 | 3/1966 | Noll et al. | 101/399 X |
| 3,351,003 | 11/1967 | McCoy | 101/29 X |

FOREIGN PATENT DOCUMENTS

| 102,490 | 9/1941 | Sweden | 101/373 |
|---|---|---|---|
| 161,916 | 7/1922 | United Kingdom | 101/19 |

Primary Examiner—Clifford D. Crowder
Attorney, Agent, or Firm—Merchant, Gould, Smith, Edell, Welter & Schmidt

[57] ABSTRACT

A marking device in the form of a branding iron having a plurality of sets of marking elements in the form of line segments mutually positioned and oriented to comprise line elements common to a plurality of recognizably different characters, together with a releasable latching arrangement for positioning selected ones of said elements in a working plane for application to an animal to be identified.

1 Claim, 7 Drawing Figures

BRANDING IRON WITH QUICKLY CHANGEABLE CHARACTERS

BACKGROUND OF THE INVENTION

This invention relates to the field of animal husbandry, and particularly to apparatus for quickly and conveniently applying indentifying markings to domestic animals.

The custom of branding animals in a herd to indicate a common ownership has long been recognized. With more refined methods of husbandry, it becomes desirable that each animal in a herd bear in an individual mark by which it can be identified. The most common identifying characters are the arabic numerals, although alphabetical characters may also be used.

It is to be borne in mind that when a multi-digit number must be used, the animal does not readily tolerate application of the digits one after another: for practical success, any numbering must be accomplished as a single operation. This, of course, results in a need for a marking device which is easily and conveniently reset to a new configuration of plural digits after each use.

SUMMARY OF THE INVENTION

The present invention comprises a plurality of marking elements in the form of straight line segments, mutually positioned and oriented to form the outline and midline of a rectangle. Means are provided for individually advancing these elements into a common working plane and retaining them there, for resiliently retaining the elements out of that plane unless so advanced, and for releasing all advanced elements so that a new combination thereof may be advanced for use.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

DESCRIPTION OF THE PREFERRED EMBODIMENT

Figure 2:
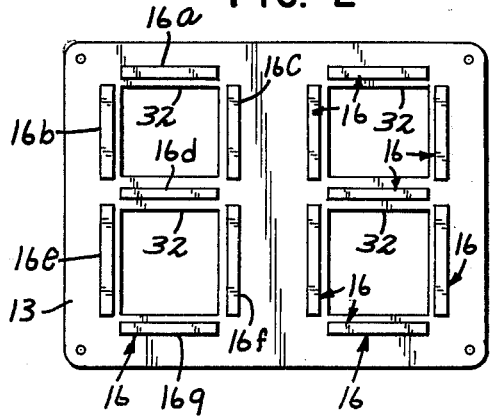
FIG. 2 is a bottom view of this device.

In the drawing, a base plate 10 bears a handle 11 and is pierced with two sets of seven square holes 12. A guide plate 13 similarly perforated by sets of square holes 12' is mounted parallel to but spaced from base 10 by spacers 14. The square holes are traversed by sets of square rods 15: beyond guide plate 13, rods 15 carry marking elements 16 which cooperate in sets to form the outlines and midlines of a pair of rectangles. In FIG. 2, one set of these elements has been further identified by subscripts a to g.

Figure 3:
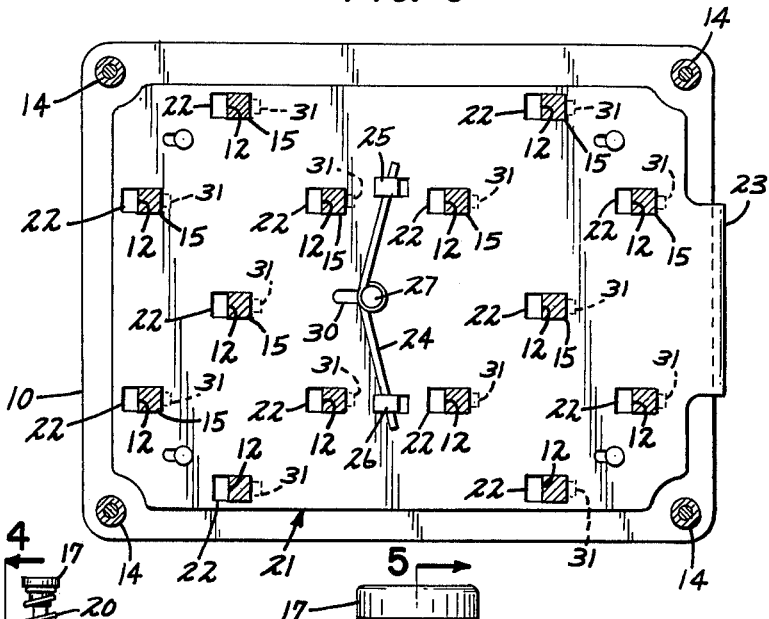
FIG. 3 is a sectional view along the line 3—3 of FIG. 1.
Figure 4:
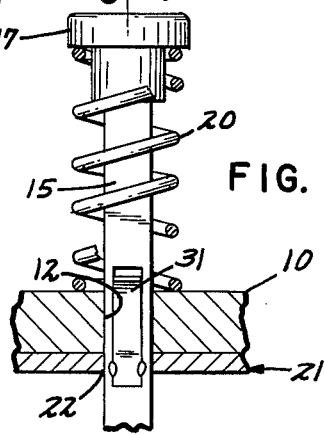
FIG. 4 is a detailed fragmentary sectional view along the line 4—4 of FIG. 1.
Figure 5:
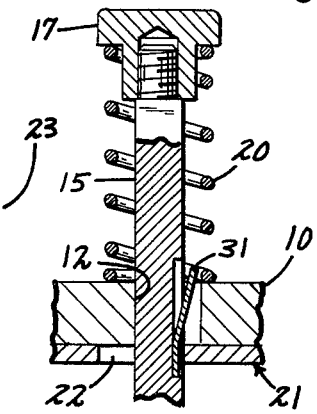
FIG. 5 is a sectional view along the line 5—5 of FIG. 4.

As shown in FIGS. 4 and 5, each rod 15 carries an actuator or finger button 17, and a compression spring 20 acts between finger button 17 and base plate 10 to urge the element 16 toward guide plate 13. A latching plate 21 is slidably secured to the surface of plate 10 remote from springs 20, and is traversed by rectangular holes 22 in line with holes 12 in base plate 10. Holes 22 are enlarged in the direction of sliding of plate 21. One end of plate 21 is turned to provide an operating lip 23, and a torsion spring 24 acts between a pair of abutments 25, 26 carried by plate 21 and a pin 27 carried by base plate 10 and projecting through a slot 30 in plate 21, to urge plate 21 to the left as seen in FIG. 3.

Figure 1:
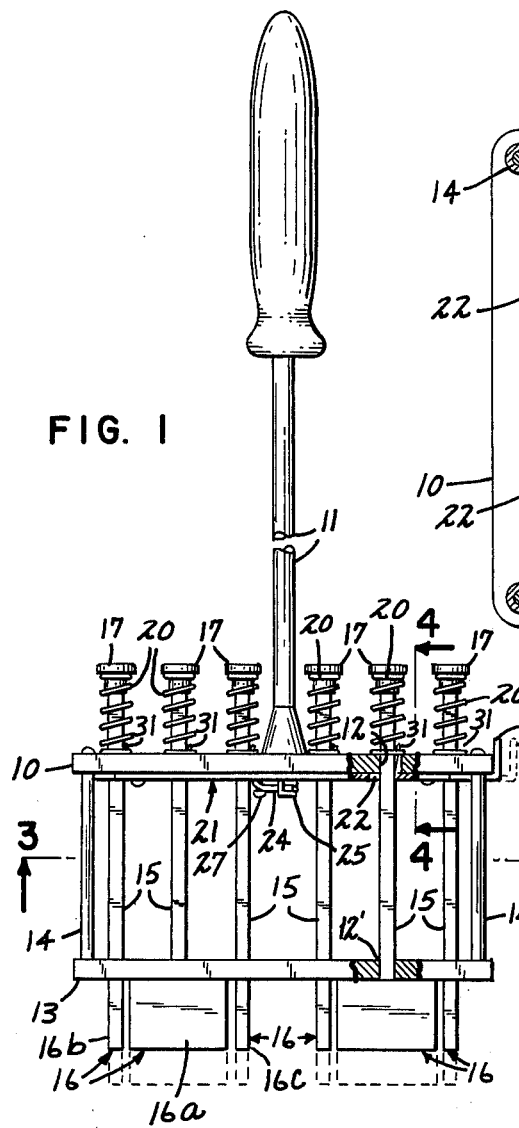
FIG. 1 is a view in elevation of a marking device according to my invention.
Figure 6:
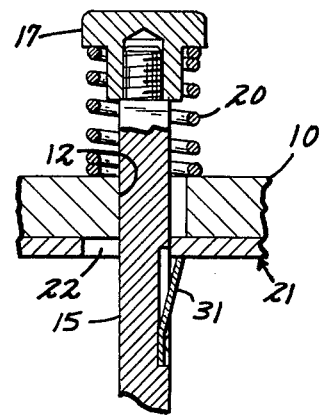
FIG. 6 is a view like FIG. 5 in a different position of the structure.

Secured to one face of each rod 15 is a spring detent 31. As best shown in FIG. 6, when button 17 is pressed and rod 15 moves toward guide plate 13, detent 31 moves past plate 10 and flexes to pass plate 21, and then resiles so that its end engages plate 21, preventing return of rod 15 to its normal position. By this procedure, the element 16 attached to rod 15 is displaced (see FIG. 1) from a normal, solid line position to a working, dotted line position. The outer surfaces of elements 16 so displaced define a working plane.

Figure 7:
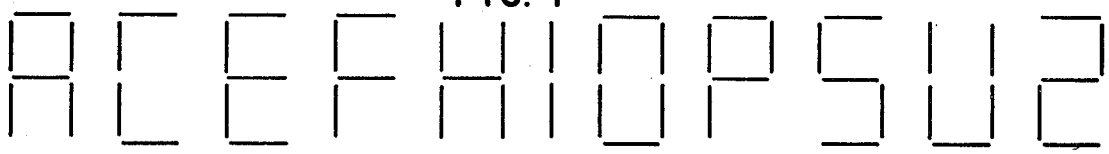
FIG. 7 shows some of the characters available in my marker.

FIG. 7 shows some of the alphanumeric characters which can be created by use of element 16. Thus, A is formed by all the elements except 16g, I or arabic 1 by only elements 16b and 16e or 16c and 16f, and S or arabic 2 by elements 16a, c, d, e and g.

To release a set of elements, contact force is applied to lip 23, displacing plate 21 to the right in FIG. 3. This frees the ends of all detents 31, allowing all rods 15 to return to their normal position, after which a new character or characters may be set up by pressing the appropriate actuators 17.

Rods 15 are made of such length that the heat conducted to actuator 17, springs 20 and detents 31 is not detrimental to proper life of the instrument. If desired, for lightness, portions of guide plate 13 may be cut away as at 32.

From the foregoing, it will be apparent that I have invented a new and simplified marking instrument or branding iron which is quickly and conveniently reset to mark any desired series of characters on a succession of animals.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:

1. A portable instrument for branding animals, comprising, in combination:
   a base plate;
   a handle projecting out of one surface of said base plate in a first direction;
   a guide plate;
   means mounting said guide plate spaced from and substantially parallel to said base plate on the side thereof removed from said handle;

a plurality of non-circular rods slidable through like non-circular aligned holes in said base and guide plates, to project therebeyond;

a like plurality of heatable marking elements fixed to the ends of said rods which extend beyond said guide plate, said elements being configured and positioned to jointly define the sides and midlines of a plurality of adjacent rectangular figures;

finger buttons fixed to the ends of said rods which extend beyond said base plate;

resilient means acting between said base plate and said finger buttons for normally maintaining said elements against said guide plates;

detent means carried by said rods for holding them individually in working positions in which they define a working plane;

release means traversed by said rods for engagement by said detent means in the working positions of said rods and operable out of a normal position to simultaneously release the detents of all rods which are in working position;

and means resiliently urging said release means into said normal position, the displacement between said base plate and said guide plate being such that heat conduction from such marking elements is not detrimental to said resilient means and said detent means.

* * * * *